United States Patent
Ukai et al.

(10) Patent No.: US 11,628,744 B2
(45) Date of Patent: Apr. 18, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hayahito Ukai, Tokyo (JP); Takashi Tsujioka, Tokyo (JP); Takehiro Horigome, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/557,083

(22) Filed: Dec. 21, 2021

(65) Prior Publication Data

US 2022/0203866 A1 Jun. 30, 2022

(30) Foreign Application Priority Data

Dec. 28, 2020 (JP) .............................. JP2020-218397

(51) Int. Cl.
*B60L 58/24* (2019.01)
*B60L 58/13* (2019.01)
(Continued)

(52) U.S. Cl.
CPC ............. *B60L 58/24* (2019.02); *B60L 3/0046* (2013.01); *B60L 58/13* (2019.02); *B60W 10/18* (2013.01);
(Continued)

(58) Field of Classification Search
None
See application file for complete search history.

(56) References Cited

U.S. PATENT DOCUMENTS

2013/0338871 A1* 12/2013 Kubo ................... H01M 10/48
701/29.2
2018/0354368 A1* 12/2018 Gotoh ................... B60K 6/365

FOREIGN PATENT DOCUMENTS

JP 2017-196965 11/2017
JP 2018-181475 11/2018
(Continued)

OTHER PUBLICATIONS

Japanese Office Action for Japanese Patent Application No. 2020-218397 dated May 31, 2022.

*Primary Examiner* — Jared Fureman
*Assistant Examiner* — Joel Barnett
(74) *Attorney, Agent, or Firm* — Amin, Turocy & Watson, LLP (57) ABSTRACT

A vehicle control device includes a main control device, a sub-control device, and a temperature detection unit. The main control device includes a recognition unit that recognizes a peripheral situation of a vehicle, a driving control unit that controls steering and acceleration/deceleration of the vehicle independently from an operation of a driver, and a mode determination unit that determines a driving mode of the vehicle. The sub-control device is capable of controlling the vehicle in place of the main control device. The temperature detection unit detects a temperature of a second battery that is different from a first battery supplying power to the main control device and supplies power to the sub-control device. The mode determination unit changes the driving mode of the vehicle from the second driving mode to the first driving mode when a temperature of the second battery is lower than a predetermined temperature.

5 Claims, 4 Drawing Sheets

(51) Int. Cl.
*B60L 3/00* (2019.01)
*B60W 10/26* (2006.01)
*B60W 10/18* (2012.01)
B60W 10/30 (2006.01)
H01M 10/625 (2014.01)

(52) U.S. Cl.
CPC ............. *B60W 10/26* (2013.01); *B60W 10/30* (2013.01); *H01M 10/625* (2015.04)

(56) References Cited

FOREIGN PATENT DOCUMENTS

| | | | |
|---|---|---|---|
| JP | 2018181475 A | * | 11/2018 |
| JP | 2019-117686 | | 7/2019 |
| JP | 2019-189029 | | 10/2019 |
| JP | 2020-152139 | | 9/2020 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-218397, filed Dec. 28, 2020, the content of which is incorporated herein by reference.

BACKGROUND OF THE INVENTION

Field of the Invention

The present invention relates to a vehicle control device, a vehicle control method, and a storage medium.

Description of Related Art

Conventionally, an invention of a vehicle control device that permits execution of automatic driving control of a vehicle when an amount of electric power required for a specific function can be discharged from a battery has been disclosed (for example, refer to Japanese Unexamined Patent Application, First Publication No. 2020-152139).

SUMMARY OF THE INVENTION

However, performance of a battery can vary depending on a temperature.

Therefore, with the conventional technology, it may not be possible to properly control a vehicle depending on the temperature of a battery.

Aspects according to the present invention have been made in consideration of such circumstances, and an object is to provide a vehicle control device, a vehicle control method, and a storage medium that can be appropriately controlled according to a temperature of a battery.

The present invention has adopted the following aspects to solve the problems described above.

(1): According to one aspect of the present invention, a vehicle control device includes a main control device that includes a recognition unit configured to recognize a peripheral situation of a vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, and to change the driving mode of the vehicle to a driving mode with a heavier task load when the second driving mode is a driving mode in which a task load imposed on the driver is lighter than in the first driving mode, at least a part of the plurality of driving modes including the second driving mode is controlled by the driving control unit, and a predetermined condition is satisfied, a sub-control device that has the same configuration as the main control device, and is capable of controlling the vehicle in place of the main control device, and a temperature detection unit configured to detect a temperature of the second battery that is different from the first battery supplying power to the main control device and supplies power to the sub-control device, in which the mode determination unit changes the driving mode of the vehicle from the second driving mode to the first driving mode when a temperature of the second battery is lower than a predetermined temperature.

(2): In the aspect of (1) described above, the second battery may be provided in a trunk room of the vehicle.

(3): In the aspect of (1) or (2) described above, the second battery may be a battery using a lead-acid battery.

(4): According to another aspect of the present invention, a vehicle control method includes, by a computer mounted in a vehicle that is controlled by a main control device that includes a recognition unit configured to recognize a peripheral situation of the vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, and to change the driving mode of the vehicle to a driving mode with a heavier task load when the second driving mode is a driving mode in which a task load imposed on the driver is lighter than in the first driving mode, at least a part of the plurality of driving modes including the second driving mode is controlled by the driving control unit, and a predetermined condition is satisfied, and a sub-control device that has the same configuration as the main control device, and is capable of controlling the vehicle in place of the main control device, acquiring temperature information of a second battery that is different from a first battery supplying power to the main control device and supplies power to the sub-control device, and changing the driving mode of the vehicle from the second driving mode to the first driving mode when a temperature of the second battery is lower than a predetermined temperature.

(5): According to still another aspect of the present invention, a computer-readable non-transitory storage medium stores a program that causes a computer mounted in a vehicle that is controlled by a main control device that includes a recognition unit configured to recognize a peripheral situation of the vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, and to change the driving mode of the vehicle to a driving mode with a heavier task load when the second driving mode is a driving mode in which a task load imposed on the driver is lighter than in the first driving mode, at least a part of the plurality of driving modes including the second driving mode is controlled by the driving control unit, and a predetermined condition is satisfied, and a sub-control device that has the same configuration as the main control device, and is capable of controlling the vehicle in place of the main control device to execute acquiring temperature information of a second battery that is different from a first battery supplying power to the main control device and supplies power to the sub-control device, and changing the driving mode of the vehicle from the second driving mode to the first driving mode when a temperature of the second battery is lower than a predetermined temperature.

According to the aspects of (1) to (5) described above, it is possible to appropriately control a vehicle according to a temperature of a battery by acquiring a temperature of a second battery that is different from a first battery supplying power to a main control device and supplies power to a sub-control device, and changing a driving mode of the vehicle from a second driving mode to a first driving mode in which a heavier task load is imposed on the driver when a temperature of the second battery is lower than a predetermined temperature.

DETAILED DESCRIPTION OF THE INVENTION

Hereinafter, embodiments of a vehicle control device, a vehicle control method, and a storage medium according to the present invention will be described with reference to the drawings.

Overall Configuration

Figure 1:
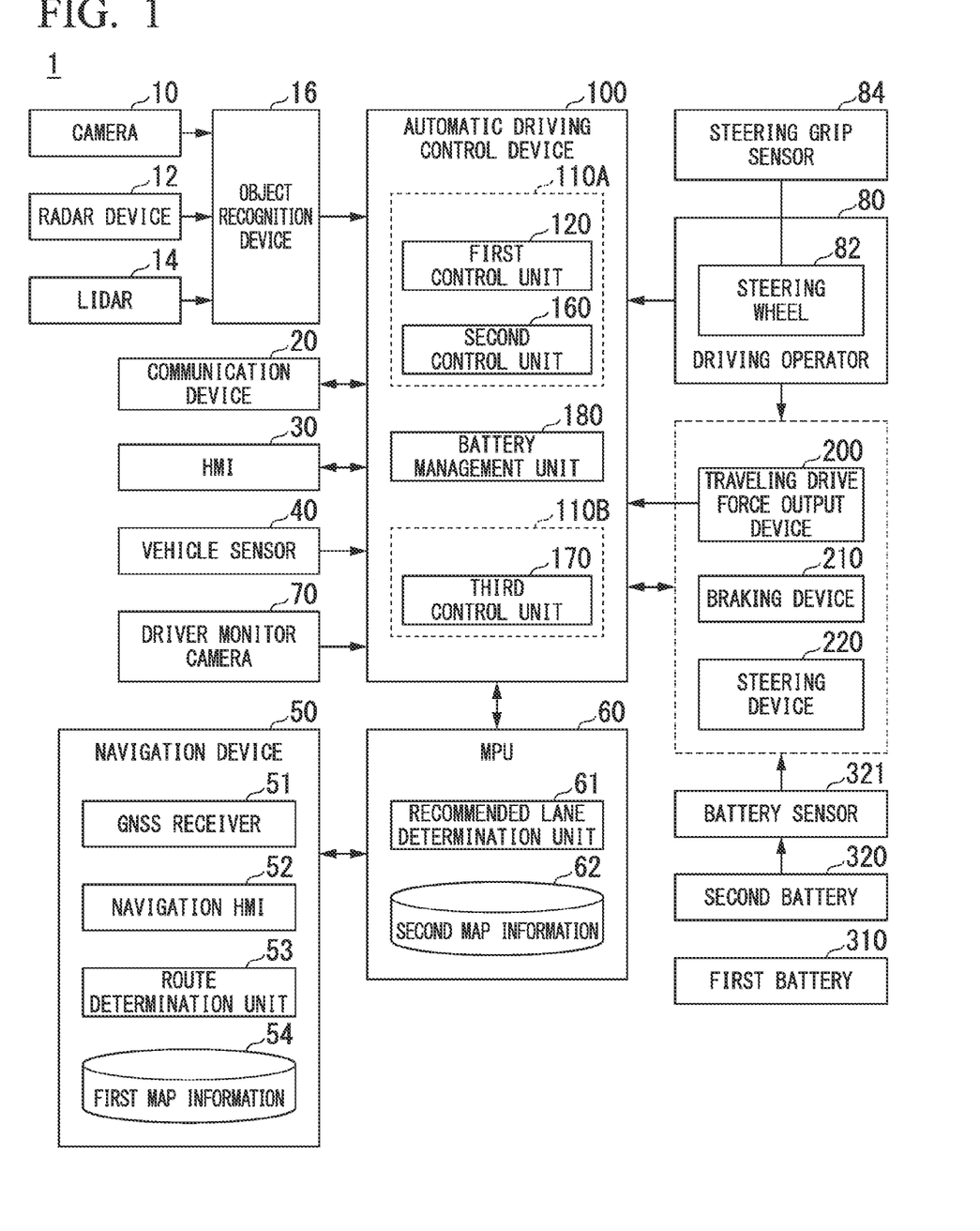
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates by using electric power generated by a generator connected to the internal combustion engine or discharged electric power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automatic driving control device 100, a traveling drive force output device 200, a braking device 210, a steering device 220, and a first battery 310, a second battery 320, and a battery sensor 321. These devices and apparatuses are connected to each other by multiplex communication lines such as controller area network (CAN) communication lines, serial communication lines, wireless communication networks, and the like. A configuration shown in FIG. 1 is merely an example, and a part of the configuration may be omitted or another configuration may be added thereto. The battery sensor 321 is an example of a "temperature detection unit."

The camera 10 is a digital camera that uses a solid-state image sensor such as a charge coupled device (CCD) or a complementary metal oxide semiconductor (CMOS). The camera 10 is attached to an arbitrary part on a vehicle (hereinafter, a host vehicle M) in which the vehicle system 1 is mounted. When the front is imaged, the camera 10 is attached to an upper part of the front windshield, a back surface of the rearview mirror, or the like. The camera 10 periodically and repeatedly images, for example, a periphery of the host vehicle M. The camera 10 may be a stereo camera.

The radar device 12 emits radio waves such as millimeter waves around the host vehicle M, and also detects radio waves (reflected waves) reflected by an object to detect at least a position (a distance and an orientation) of the object. The radar device 12 is attached to any part of the host vehicle M. The radar device 12 may detect the position and speed of an object by a frequency modulated continuous wave (FM-CW) method.

The LIDAR 14 irradiates the periphery of the host vehicle M with light (or an electromagnetic wave having a wavelength close to that of light) and measures scattered light. The LIDAR 14 detects a distance to a target on the basis of a time from light emission to light reception. The emitted light is, for example, a pulse-shaped laser beam. The LIDAR 14 is attached to any part of the host vehicle M.

The object recognition device 16 performs sensor fusion processing on results of detections by a part or all of the camera 10, the radar device 12, and the LIDAR 14, and recognizes the position, type, speed, and the like of the object. The object recognition device 16 outputs a result of the recognition to the automatic driving control device 100. The object recognition device 16 may output the results of detections by the camera 10, the radar device 12, and the LIDAR 14 to the automatic driving control device 100 as they are. The object recognition device 16 may be omitted from the vehicle system 1.

The communication device 20 communicates with other vehicles present in the periphery of the host vehicle M or communicates with various server devices via a wireless base station by using, for example, a cellular network, a Wi-Fi network, Bluetooth (a registered trademark), or dedicated short-range communication (DSRC).

The HMI 30 presents various types of information to occupants of the host vehicle M and receives input operations by the occupants. The HMI 30 includes various display devices, speakers, buzzers, touch panels, switches, keys and the like.

The vehicle sensor 40 includes a vehicle speed sensor that detects a speed of the host vehicle M, an acceleration sensor that detects the acceleration, a yaw rate sensor that detects the angular velocity around the vertical axis, an orientation sensor that detects a direction of the host vehicle M, and the like.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determination unit 53 determines, for example, a route from the position of the host vehicle M identified by the GNSS receiver 51 (or an arbitrary position to be input) to a destination input by the occupant using the navigation HMI 52 (hereinafter, a route on a map) with reference to the first map information 54. The first map information 54 is, for example, information in which a road shape is expressed by a link indicating a road and nodes connected by the link. The first map information 54 may include road curvature, point of interest (POI) information, and the like. The route on a map is output to the MPU 60. The navigation device 50 may provide route guidance using the navigation HMI 52 on the basis of the route on a map. The navigation device 50 may be realized by, for example, functions of a terminal device such as a smartphone or a tablet terminal owned by the occupant. The navigation device 50 may transmit a current position and a destination to the navigation server via the communication device 20 and acquire a route equivalent to the route on a map from the navigation server.

The MPU 60 includes, for example, a recommended lane determination unit 61, and holds second map information 62 in a storage device such as an HDD or a flash memory. The recommended lane determination unit 61 divides the route on a map provided by the navigation device 50 into a plurality of blocks (for example, divides the route every 100 [m] in a vehicle traveling direction), and determines a recommended lane for each block with reference to the second map information 62. The recommended lane determination unit 61 determines which lane to drive from the left. When a branch part is present on the route on a map, the recommended lane determination unit 61 determines a recommended lane so that the host vehicle M can travel on a reasonable route to proceed to the branch destination.

The second map information 62 is map information with higher accuracy than the first map information 54. The second map information 62 includes, for example, information on a center of a lane, information on a boundary of a lane, and the like. The second map information 62 may include road information, traffic regulation information, address information (address/zip code), facility information, telephone number information, and the like. The second map information 62 may be updated at any time by the communication device 20 communicating with another device.

The driver monitor camera 70 is, for example, a digital camera that uses a solid-state image sensor such as a CCD or CMOS. The driver monitor camera 70 is attached to an arbitrary part in the host vehicle M at a position and in a direction in which the head of an occupant seated in a driver's seat of the host vehicle M (hereinafter, referred to as a driver) can be imaged from the front (in a direction in which the face is imaged). For example, the driver monitor camera 70 is attached to a top of a display device provided at a center of an instrument panel of the host vehicle M.

The driving operator 80 includes, for example, an accelerator pedal, a brake pedal, a shift lever, and other operators in addition to a steering wheel 82. The driving operator 80 is equipped with a sensor that detects an amount of an operation or a presence or absence of an operation, and a result of detection by the driving operator is output to the automatic driving control device 100, or some or all of the traveling drive force output device 200, the braking device 210, and the steering device 220. The steering wheel 82 is an example of an "operator that receives a steering operation performed by the driver." The operator does not necessarily have to be annular, and may be in a form of a deformed steering wheel, a joystick, a button, or the like. A steering grip sensor 84 is attached to the steering wheel 82. The steering grip sensor 84 is realized by a capacitance sensor or the like, and transmits a signal capable of detecting whether the driver is gripping the steering wheel 82 (meaning that the driver is in contact with the steering wheel 82 while a force is applied) to the automatic driving control device 100.

The automatic driving control device 100 includes, for example, a main control device 110A, a sub-control device 110B, and a battery management unit 180. The main control device 110A includes a first control unit 120 and a second control unit 160. The sub-control device 110B includes a third control unit 170. In the present embodiment, it is assumed that the main control device 110A and the sub-control device 110B are separate devices, but the main control device 110A and the sub-control device 110B may also be configured as chipsets on separate substrates in which a power supply and an input/output unit are separated in a common device housing. In the present embodiment, it is assumed that the battery management unit 180 is configured by hardware different from the main control device 110A and the sub-control device 110B, but the battery management unit 180 may also be configured as a part of the main control device 110A and the sub-control device 110B.

The first control unit 120, the second control unit 160, the third control unit 170, and the battery management unit 180 are respectively realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), a graphics processing unit (GPU), or may also be realized by cooperation of software and hardware. The program may be stored in advance in a storage device (a storage device having a non-transitory storage medium) such as an HDD or a flash memory of the automatic driving control device 100, or may be stored in a detachable storage medium such as a DVD or a CD-ROM and may be installed in the HDD or flash memory of the automatic driving control device 100 by the storage medium (non-transitory storage medium) being mounted in a drive device. The automatic driving control device 100 is an example of a "vehicle control device," and a combination of an action plan generation unit 140 and the second control unit 160 is an example of a "driving control unit."

Figure 2:
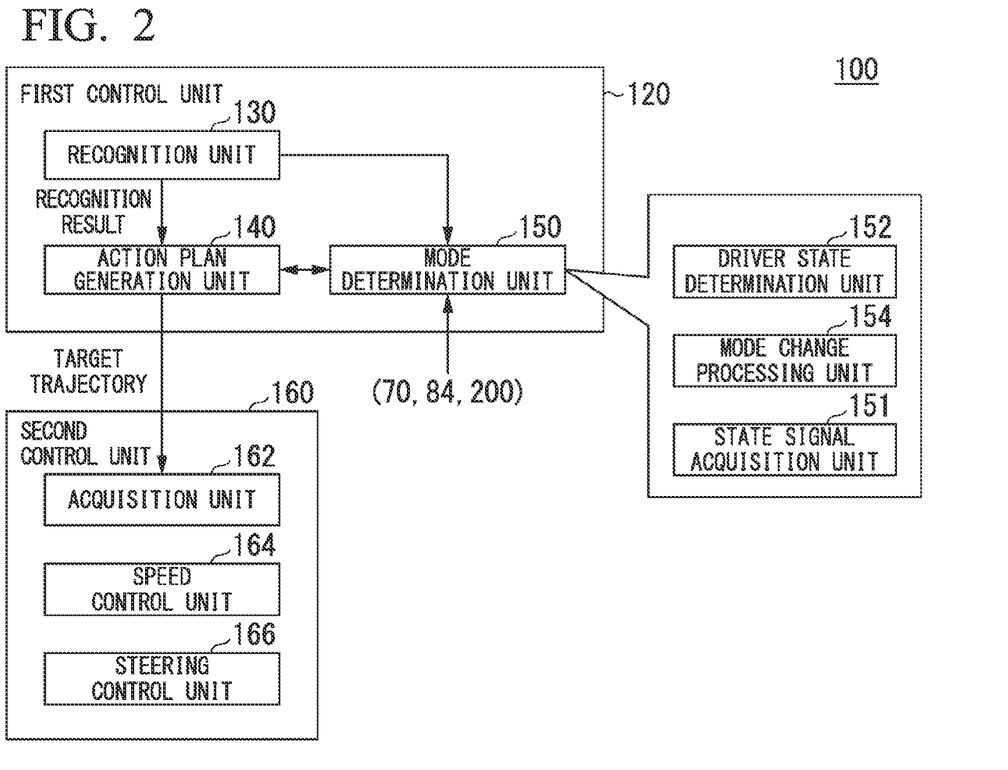
FIG. 2 is a functional configuration diagram of a first control unit and a second control unit.

FIG. 2 is a functional configuration diagram of the first control unit 120 and the second control unit 160. The first control unit 120 includes, for example, a recognition unit 130, the action plan generation unit 140, and a mode determination unit 150. The first control unit 120 realizes, for example, a function of Artificial Intelligence (AI) and a function of a predetermined model in parallel. For example, a function of "recognizing an intersection" is realized by executing recognition of recognizing an intersection using deep learning or the like and recognition based on predetermined conditions (whether there are signals that can be pattern matched, road markings, or the like) in parallel and by scoring both sides and comprehensively evaluating them. As a result, reliability of automatic driving is ensured.

The recognition unit 130 recognizes states of an object in the periphery of the host vehicle M, such as the position, the speed, and the acceleration, on the basis of information input from the camera 10, the radar device 12, and the LIDAR 14 via the object recognition device 16. The position of an object is recognized as, for example, a position on absolute coordinates with a representative point of the host vehicle M (a center of gravity, a center of the drive axis, or the like) as an origin, and is used for control. The position of an object may be represented by a representative point such as the center of gravity or a corner of the object, or may be represented by a region. The "states" of an object may include the acceleration, jerk, or "behavioral state" (for example, whether it is changing lanes or is about to change lanes).

The recognition unit 130 recognizes, for example, a lane (a traveling lane) in which the host vehicle M is traveling. For example, the recognition unit 130 recognizes the traveling lane by comparing a pattern of road lane markings obtained from the second map information 62 (for example, an array of solid lines and broken lines) and a pattern of road lane markings in the periphery of the host vehicle M recognized from an image captured by the camera 10. The recognition unit 130 may recognize the traveling lane by recognizing not only the road lane markings but also a traveling road boundary (a road boundary) including the road lane markings, a road shoulder, a curb, a median strip, a guardrail, and the like. In this recognition, the position of the host vehicle M acquired from the navigation device 50 and a result of processing performed by an INS may be added. The recognition unit 130 recognizes temporary stop lines, obstacles, red lights, tollhouses, and other road events.

The recognition unit 130 recognizes the position and posture of the host vehicle M with respect to the traveling lane when the traveling lane is recognized. The recognition unit 130 may recognize, for example, a deviation of a reference point of the host vehicle M from the center of a lane and an angle formed against a line connecting the center of a lane in the traveling direction of the host vehicle M as a relative position and the posture of the host vehicle M with respect to the traveling lane. Instead, the recognition unit 130 may recognize a position or the like of the reference point of the host vehicle M with respect to any side end (road lane markings or a road boundary) of the traveling lane as the relative position of the host vehicle M with respect to the traveling lane.

In principle, the action plan generation unit 140 generates a target trajectory in which the host vehicle M travels in a recommended lane determined by the recommended lane determination unit 61, and will automatically (independently from an operation of the driver) travel to be able to respond to situations in the periphery of the host vehicle M. The target trajectory includes, for example, a speed element. For example, the target trajectory is expressed as an array of points (trajectory points) to be reached by the host vehicle M. The trajectory point is a point to be reached by the host vehicle M for each predetermined traveling distance (for example, about several [m]) along a road, and separately, a target speed and a target acceleration for each predetermined sampling time (for example, about 0 comma [sec]) are generated as a part of the target trajectory. The trajectory point may be a position to be reached by the host vehicle M at a corresponding sampling time for each predetermined sampling time. In this case, information of the target speed and the target acceleration is expressed by an interval of trajectory points.

The action plan generation unit 140 may set an event for automatic driving when a target trajectory is generated. The automatic driving event includes a constant speed traveling event, a low speed following traveling event, a lane change event, a branching event, a merging event, a takeover event, and the like. The action plan generation unit 140 generates a target trajectory according to an activated event.

The mode determination unit 150 determines a driving mode of the host vehicle M to be one of a plurality of driving modes having different tasks imposed on the driver. The mode determination unit 150 includes, for example, a state signal acquisition unit 151, a driver state determination unit 152, and a mode change processing unit 154. These individual functions will be described below.

Figure 3:
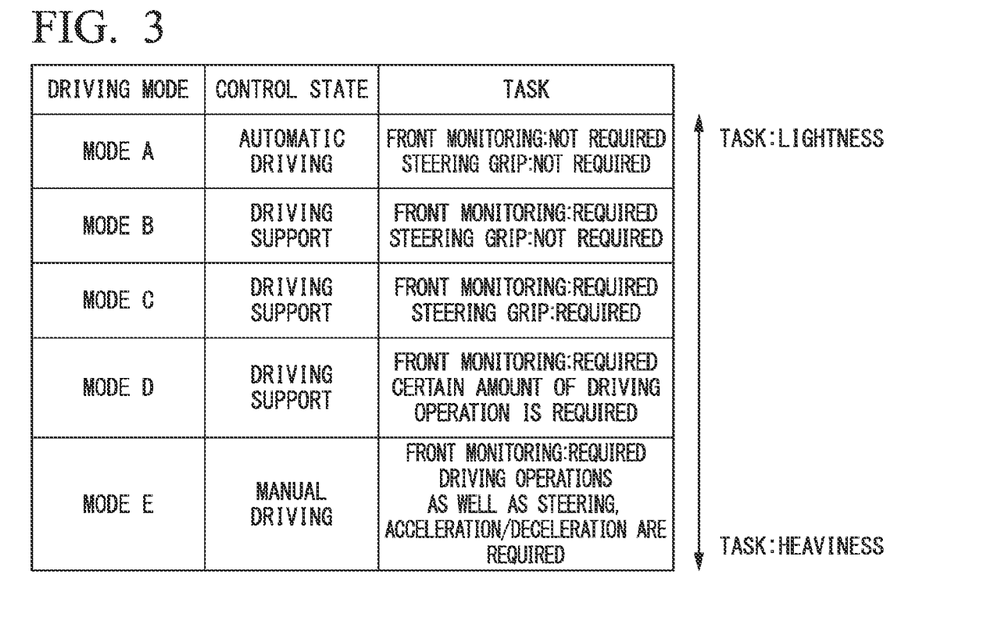
FIG. 3 is a diagram which shows an example of a corresponding relationship between a driving mode and a control state and a task of a host vehicle.

FIG. 3 is a diagram which shows an example of corresponding relationships between a driving mode, a control state of the host vehicle M, and a task. Driving modes of the host vehicle M include, for example, five modes from a mode A to a mode E. The control state, that is, a degree of automation of a driving control of the host vehicle M, is highest in the mode A, then decreases in the order of the mode B, the mode C, and the mode D, and is lowest in the mode E. On the other hand, a task load imposed on the driver is lightest in the mode A, then becomes heavier in the order of the mode B, the mode C, and the mode D, and is heaviest in the mode E. Since the control state is not automatic driving in the modes D and E, it is a duty of the automatic driving control device 100 to end control related to automatic driving and shift to driving support or manual driving. The content of each driving mode will be exemplified below.

In the mode A, the vehicle is in a state of automatic driving, and neither forward monitoring nor gripping of the steering wheel 82 (steering gripping in FIG. 3) is imposed on the driver. However, even in the mode A, the driver is required to be in a position to quickly shift to manual driving in response to a request from a system centered on the automatic driving control device 100. The term "automatic driving" herein means that both steering and acceleration/deceleration are controlled independently from an operation of the driver. The front is a space in the traveling direction of the host vehicle M which is visible through the front windshield. The mode A is, for example, a driving mode which can be executed when the host vehicle M is traveling at a predetermined speed (for example, about 50 [km/h]) or less on a motorway such as an expressway, and a condition such as the presence of a preceding vehicle to follow is satisfied, and is referred to as traffic jam pilot (TJP) in some cases. When this condition is no longer satisfied, the mode determination unit 150 changes the driving mode of the host vehicle M to the mode B.

In the mode B, the vehicle is in a driving support state, and the task of monitoring the front of the host vehicle M (hereinafter referred to as forward monitoring) is imposed on the driver, but the task of gripping the steering wheel 82 is not imposed. In the mode C, the vehicle is in the driving support state, and the task of forward monitoring and the task of gripping the steering wheel 82 are imposed on the driver. The mode D is a driving mode that requires a certain amount of driving operation by the driver for at least one of the steering and the acceleration/deceleration of the host vehicle M. For example, in the mode D, driving assistance such as adaptive cruise control (ACC) and lane keeping assist system (LKAS) is performed. In the mode E, the vehicle is in a state of manual operation that requires a driving operation by the driver in both steering and acceleration/deceleration. In both of the mode D and the mode E, a task of monitoring the front of the host vehicle M is imposed on the driver naturally.

The automatic driving control device 100 (and a driving support device (not shown)) executes an automatic lane change according to the driving mode. Automatic lane changes include an automatic lane change (1) according to a system request and an automatic lane change (2) according to a driver request. Automatic lane changes (1) include an automatic lane change for passing, which is performed when the speed of a preceding vehicle is less than the speed of the host vehicle by a reference or more, and an automatic lane change for proceeding toward a destination (an automatic lane change due to a change in recommended lane). In the automatic lane change (2), when conditions related to a speed and a positional relationship with surrounding vehicles are satisfied, and when a turn signal is operated by the driver, the host vehicle M is caused to change lanes toward an operation direction.

The automatic driving control device 100 does not execute the automatic lane change (1) or (2) in the mode A. The automatic driving control device 100 executes both of the automatic lane changes (1) and (2) in the modes B and C. The driving support device (not shown) executes the automatic lane change (2) without executing the automatic lane change (1) in the mode D. In the mode E, neither of the automatic lane changes (1) and (2) is executed.

The mode determination unit 150 changes the driving mode of the host vehicle M to a driving mode in which the task load is heavier when a task related to a determined driving mode (hereinafter referred to as a current driving mode) is not executed by the driver.

For example, in the mode A, when the driver is in a position in which he or she cannot shift to manual driving in response to a request from the system (for example, when he or she continues to look sideways outside a permissible area or when a sign that driving becomes difficult is detected), the mode determination unit 150 uses the HMI 30 to urge the driver to shift to manual driving, and performs control such that the host vehicle M is moved to a road shoulder and is stopped gradually to stop the automatic driving if the driver does not respond. After the automatic driving is stopped, the host vehicle will be in the mode D or E, and the host vehicle M can be started by the manual operation of the driver. In the following description, this is what is referred to as "stopping automatic driving." When the driver is not monitoring the front in the mode B, the mode determination unit 150 uses the HMI 30 to urge the driver to monitor the front, and performs control such that the host vehicle M is moved to a road shoulder and is stopped gradually to stop the automatic driving if the driver does not respond. When the driver is not monitoring the front in the mode C, or when the driver is not gripping the steering wheel 82, the mode determination unit 150 uses the HMI 30 to urge the driver to monitor the front and/or to grip the steering wheel 82, and performs control such that the host vehicle M is moved to a road shoulder and is stopped gradually to stop the automatic driving if the driver does not respond.

The driver state determination unit 152 monitors a state of the driver for a mode change described above, and determines whether the state of the driver is a state corresponding to a task. For example, the driver state determination unit 152 analyzes an image captured by the driver monitor camera 70 to perform posture estimation processing, and determines whether the driver is in a position where he or she cannot shift to manual operation in response to a request from the system. The driver state determination unit 152 analyzes the image captured by the driver monitor camera 70 to perform line-of-sight estimation processing, and determines whether the driver is monitoring the front.

The state signal acquisition unit 151 acquires a state signal from the battery sensor 321 via the traveling drive force output device 200. A state signal is a signal output by the battery sensor 321 and is a signal indicating a value corresponding to the state of the second battery 320. For example, the state signal is output from the battery sensor 321 to the traveling drive force output device 200, and is output to the automatic driving control device 100 via the traveling drive force output device 200. For example, the battery sensor 321 includes a thermometer and a wattmeter, and outputs a state signal indicating a temperature of the second battery 320 (hereinafter referred to as a "temperature signal") and a state signal indicating discharged power of the second battery 320 (hereinafter referred to as a "discharge signal") as state signals. The state signal acquisition unit 151 records time-series information of the acquired state signal (hereinafter referred to as "state information") in an internal memory of the automatic driving control device 100. In the following description, in the time-series information included in the state information, time-series information indicating a temperature signal is referred to as "temperature information," and time-series information indicating a discharge signal is referred to as "discharge information."

The mode change processing unit 154 performs various types of processing for changing the modes. For example, the mode change processing unit 154 instructs the action plan generation unit 140 to generate a target trajectory for stopping at a road shoulder, gives an operation instruction to a driving support device (not shown), and performs control of the HMI 30 to urge the driver to take an action.

The second control unit 160 controls the traveling drive force output device 200, the braking device 210, and the steering device 220 such that the host vehicle M passes through a target trajectory generated by the action plan generation unit 140 according to a scheduled time.

Returning to FIG. 2, the second control unit 160 includes, for example, an acquisition unit 162, a speed control unit 164, and a steering control unit 166. The acquisition unit 162 acquires information of a target trajectory (a trajectory point) generated by the action plan generation unit 140 and stores it in a memory (not shown). The speed control unit 164 controls the traveling drive force output device 200 or the braking device 210 on the basis of a speed element associated with the target trajectory stored in the memory. The steering control unit 166 controls the steering device 220 according to a degree of bending of the target trajectory stored in the memory. Processing of the speed control unit 164 and the steering control unit 166 is realized by, for example, a combination of feedforward control and feedback control. As an example, the steering control unit 166 executes the combination of feedforward control according to a curvature of a road in front of the host vehicle M and feedback control based on a deviation from the target trajectory.

The sub-control device 110B is a device that has the same control function as the main control device 110A using the third control unit 170 and can control the host vehicle M in place of the main control device 110A. The third control unit 170 has various control functions equivalent to those of the first control unit 120 and the second control unit 160, and has a function of controlling the automatic driving of the host vehicle M in place of the first control unit 120 and the second control unit 160. In other words, the third control unit 170 is a functional unit that realizes redundancy for the first control unit 120 and the second control unit 160. The automatic driving of the host vehicle M is normally controlled by the first control unit 120 and the second control unit 160. On the other hand, when it is difficult to perform control using the first control unit 120 and the second control unit 160, a control system of the automatic driving is switched to the third control unit 170.

The battery management unit 180 has a management function related to the second battery 320. For example, the battery management unit 180 executes a battery command when the second battery 320 is attached to the host vehicle M normally. The battery command is a command to execute various types of processing that need to be performed in response to successful attachment of the second battery 320 to the host vehicle M. When the battery command is executed, the second battery 320 becomes available in the host vehicle M.

The first battery 310 supplies electric power to the first control unit 120 and the second control unit 160. The second battery 320 supplies electric power to the third control unit 170. The first control unit 120 and the second control unit 160 operate with the electric power supplied by the first battery 310. The third control unit 170 operates with the electric power supplied by the second battery 320. For example, the first battery 310 is a lead-acid battery mounted in the engine room of the host vehicle M, and the second battery 320 is a lead-acid battery installed in the trunk room of the host vehicle M. The first battery 310 and the second battery 320 are appropriately charged by a large-capacity battery such as a lithium-ion battery (not shown) or electric power supplied from an AC generator (ACG) (not shown).

Figure 4:
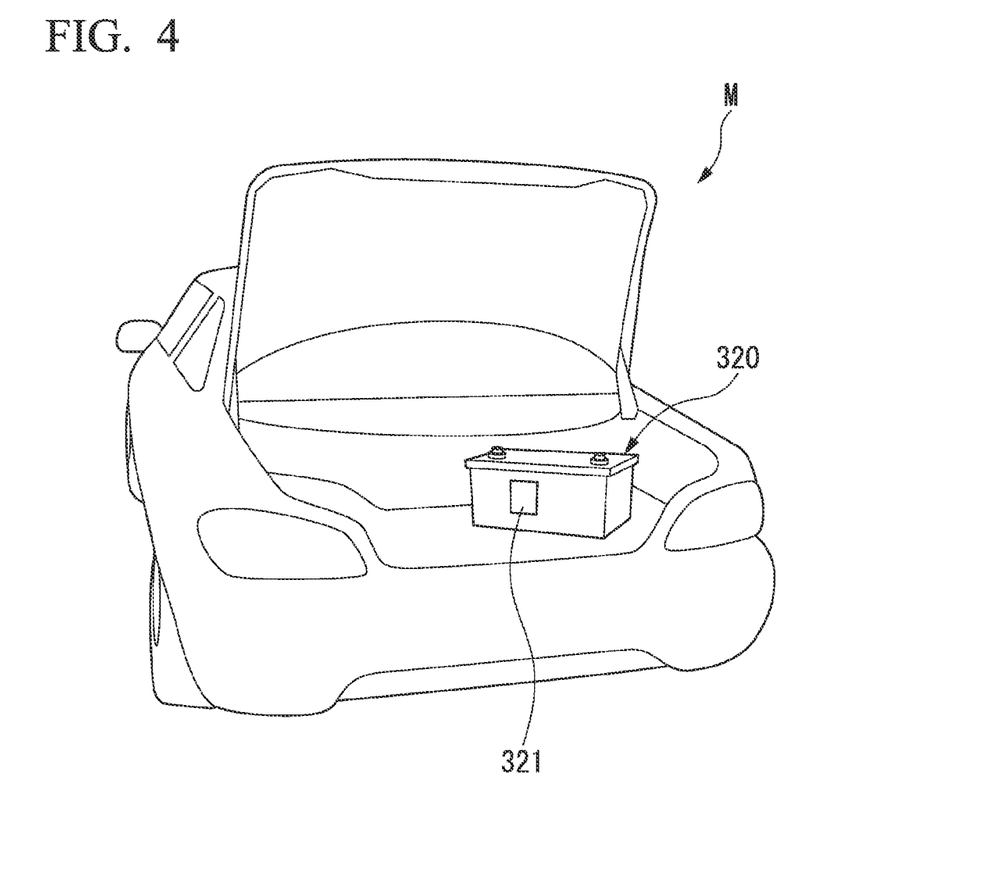
FIG. 4 is a diagram which shows an installation example of a second battery.

FIG. 4 is a diagram which shows an installation example of the second battery 320. FIG. 4 shows an example in which the second battery 320 is installed in a trunk room on a rear side of the host vehicle M. It is even better if the second battery 320 is stored and fixed in a spare tire pan of the trunk room. The host vehicle M may be a vehicle in which an engine room is provided on the rear side, and in this case, the trunk room may also be provided on a front side of the host vehicle M.

The traveling drive force output device 200 outputs a traveling drive force (torque) for the vehicle to travel to the drive wheels. The traveling drive force output device 200 includes, for example, a combination of an internal combustion engine, an electric motor, a transmission, and the like, and an electronic control unit (ECU) that controls these. The ECU controls the constituents described above according to the information input from the second control unit 160 or the information input from the driving operator 80.

The braking device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second control unit 160 or the information input from the driving operator 80 so that a brake torque corresponding to a braking operation is output to each wheel. The braking device 210 may include a mechanism for transmitting a hydraulic pressure generated by an operation of the brake pedal included in the driving operator 80 to the cylinder via a master cylinder as a backup. The braking device 210 is not limited to the configuration described above, and may be an electronically controlled hydraulic braking device that controls an actuator according to the information input from the second control unit 160 to transmit the hydraulic pressure of the master cylinder to the cylinder.

The steering device 220 includes, for example, a steering ECU and an electric motor. The electric motor, for example, applies a force to a rack and pinion mechanism to change a direction of the steering wheel. The steering ECU drives the electric motor according to the information input from the second control unit 160 or the information input from the driving operator 80, and changes the direction of the steering wheel.

Figure 5:
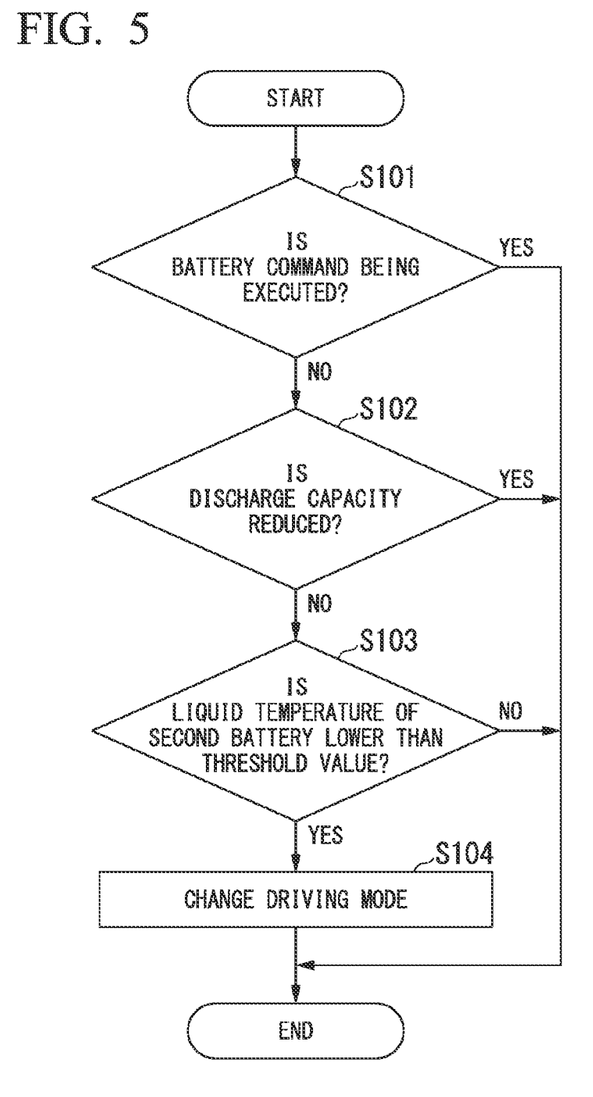
FIG. 5 is a flowchart which shows an example of a flow of processing executed by a mode determination unit.

FIG. 5 is a flowchart which shows an example of a flow of processing executed by the mode determination unit 150. Here, for the sake of simplicity, a flow of processing in one control cycle is shown, but in reality, the flow shown in FIG. 5 is periodically executed at a predetermined timing. At a start point of the flow, the automatic driving control device 100 is in a state where the first battery 310 and the second battery 320 are attached normally, and the first control unit 120 and the second control unit 160 are operating with electric power supplied by the first battery 310. In such a situation, first, the mode change processing unit 154 determines whether a battery command is being executed for the second battery 320 (step S101). According to this determination, it is determined whether the second battery 320 is in a usable state.

Here, when a battery command is not being executed, that is, when the second battery 320 is in the usable state, the mode change processing unit 154 determines a usage state of the second battery 320 on the basis of state information. Specifically, the mode change processing unit 154 determines whether a discharge capacity of the second battery 320 is reduced on the basis of discharge information (step S102), and determines whether an electrolytic solution temperature (hereinafter, also simply referred to as a "liquid temperature") of the second battery 320 is lower than a predetermined threshold value on the basis of temperature information (step S103). Here, when it is determined that the discharge capacity of the second battery 320 is not reduced and the liquid temperature of the second battery 320 is lower than the predetermined threshold value, the mode change processing unit 154 changes a current driving mode to a driving mode in which a heavier task load is imposed on the driver (step S104).

Here, a reason for changing the driving mode as in step S104 is that a decrease in the liquid temperature may reduce the discharge capacity of the second battery 320, and the second battery 320 whose discharge capacity is reduced may not supply sufficient power to the third control unit 170 and the third control unit 170 may not be able to operate normally. When a control system of the host vehicle M is switched to the third control unit 170 in such a situation, safety in traveling of the host vehicle M is lowered. For this reason, the automatic driving control device 100 of the present embodiment can ensure the safety of the host vehicle by changing the driving mode of the host vehicle M to a driving mode in which a heavier task load is imposed on the driver when the discharge capacity of the second battery 320 may be reduced.

For example, a known electrical characteristic of a lead-acid battery is that its discharge capacity is reduced when the liquid temperature falls below −6° C. For this reason, when a lead-acid battery is used as the second battery 320, it is possible to suppress a decrease in the safety of automatic driving by performing the determination described above with a threshold value of the liquid temperature set to −6° C. When a difference between a measurable temperature of the second battery 320 and an actual liquid temperature of the second battery 320 is large, the mode change processing unit 154 may be configured to estimate the liquid temperature on the basis of a measured temperature, and compare the estimated liquid temperature with the threshold value.

On the other hand, when it is determined in step S101 that a battery command is being executed for the second battery 320, when it is determined in step S102 that the discharge capacity of the second battery 320 is reduced, or when it is determined in step S103 that the liquid temperature of the second battery 320 is equal to or higher than the threshold value, the mode change processing unit 154 ends the processing without changing the driving mode.

The automatic driving control device 100 of the embodiment configured in this manner can change the driving mode of the host vehicle M to a driving mode in which a heavier task load is imposed on the driver when the temperature of the second battery 320 is lower than a predetermined temperature. Therefore, according to the automatic driving control device 100 of the embodiment, it is possible to appropriately control a vehicle according to the temperature of a battery.

In the embodiment described above, it has been described that the driving mode is changed when the temperature of the second battery 320 is lower than the threshold value, but the mode determination unit 150 may also be configured to prohibit the execution of automatic driving when the temperature of the second battery 320 is lower than the threshold value.

The embodiment described above can be expressed as follows.

A vehicle control device is configured to include a storage device that stores a program, and a hardware processor, to acquire temperature information of a second battery that is different from a first battery supplying power to the main control device and supplies power to the sub-control device, and to change a driving mode of the vehicle from the second driving mode to the first driving mode when a temperature of the second battery is lower than a predetermined temperature by the hardware executing the program on the vehicle that is controlled by a main control device that includes a recognition unit configured to recognize a peripheral situation of a vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, and to change the driving mode of the vehicle to a driving mode with a heavier task load when the second driving mode is a driving mode in which a task load imposed on the driver is lighter than in the first driving mode, at least a part of the plurality of driving modes including the second driving mode is controlled by the driving control unit, and a predetermined condition is satisfied, and a sub-control device that has the same configuration as the main control device, and is capable of controlling the vehicle in place of the main control device.

Although the modes for carrying out the present invention have been described above using the embodiments, the present invention is not limited to these embodiments, and various modifications and substitutions can be made within a range not departing from the gist of the present invention.

What is claimed is:

1. A vehicle control device comprising:
   a main control device that includes a recognition unit configured to recognize a peripheral situation of a vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, the second driving mode being a driving mode in which a task load imposed on the driver is lighter than in the first driving mode, a part of the plurality of driving modes including at least the second driving mode being controlled by the driving control unit, and configured to change the driving mode of the vehicle to another driving mode in which a heavier task load is imposed on the driver when a predetermined condition is satisfied;
   a sub-control device that has the same configuration as the main control device, and is capable of controlling the vehicle in place of the main control device; and
   a temperature detection unit configured to detect a temperature of a second battery that is different from a first battery supplying power to the main control device and supplies power to the sub-control device,
   wherein the mode determination unit changes the driving mode of the vehicle from the second driving mode to the first driving mode when the temperature of the second battery is lower than a predetermined temperature.

2. The vehicle control device according to claim 1, wherein the second battery is provided in a trunk room of the vehicle.

3. The vehicle control device according to claim 1, wherein the second battery is a battery using a lead-acid battery.

4. A vehicle control method comprising:
   by a computer mounted in a vehicle that is controlled by a main control device that includes a recognition unit configured to recognize a peripheral situation of the vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, the second driving mode being a driving mode in which a task load imposed on the driver is lighter than in the first driving mode, a part of the plurality of driving modes including at least the second driving mode being controlled by the driving control unit, and configured to change the driving mode of the vehicle to another driving mode in which a heavier task load is imposed on the driver when a predetermined condition is satisfied, and a sub-control device that has the same configuration as the main control device, and is capable of controlling the vehicle in place of the main control device,
   acquiring temperature information of a second battery that is different from a first battery supplying power to the main control device and supplies power to the sub-control device; and
   changing the driving mode of the vehicle from the second driving mode to the first driving mode when a temperature of the second battery is lower than a predetermined temperature.

5. A computer-readable non-transitory storage medium that stores a program causing a computer mounted in a vehicle that is controlled by a main control device that includes a recognition unit configured to recognize a peripheral situation of the vehicle, a driving control unit configured to control steering and acceleration/deceleration of the vehicle independently from an operation of a driver of the vehicle, and a mode determination unit configured to determine a driving mode of the vehicle to be one of a plurality of driving modes including a first driving mode and a second driving mode, the second driving mode being a driving mode in which a task load imposed on the driver is lighter than in the first driving mode, a part of the plurality of driving modes including at least the second driving mode being controlled by the driving control unit, and configured to change the driving mode of the vehicle to another driving mode in which a heavier task load is imposed on the driver when a predetermined condition is satisfied, and a sub-control device that has the same configuration as the main control device, and is capable of controlling the vehicle in place of the main control device to execute
   acquiring temperature information of a second battery that is different from a first battery supplying power to the main control device and supplies power to the sub-control device; and changing the driving mode of the vehicle from the second driving mode to the first driving mode when a temperature of the second battery is lower than a predetermined temperature.

* * * * *